(12) United States Patent
Bastide et al.

(10) Patent No.: US 9,930,136 B2
(45) Date of Patent: Mar. 27, 2018

(54) FORMING SOCIAL MEDIA GROUPS BASED ON EMOTIONAL STATES

(71) Applicant: International Business Machines Corporation, Armonk, NY (US)

(72) Inventors: Paul R. Bastide, Boxford, MA (US); Lisa Seacat DeLuca, Baltimore, MD (US); Lydia M. Do, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 14/201,388

(22) Filed: Mar. 7, 2014

(65) Prior Publication Data

US 2015/0256634 A1   Sep. 10, 2015

(51) Int. Cl.
  *G06F 15/16* (2006.01)
  *H04L 29/08* (2006.01)
  *G06Q 50/00* (2012.01)

(52) U.S. Cl.
  CPC ........... *H04L 67/306* (2013.01); *G06Q 50/01* (2013.01)

(58) Field of Classification Search
  CPC ... G06Q 10/10; H04L 29/06; H04L 29/08072; H04L 29/06027
  See application file for complete search history.

(56) References Cited

U.S. PATENT DOCUMENTS

| | | | |
|---|---|---|---|
| 2007/0282912 A1 | 12/2007 | Reiner | |
| 2008/0082613 A1 | 4/2008 | Szeto et al. | |
| 2010/0228732 A1 | 9/2010 | Rhee et al. | |
| 2011/0239137 A1 | 9/2011 | Bill | |
| 2012/0095976 A1 | 4/2012 | Hebenthal et al. | |
| 2012/0110071 A1 | 5/2012 | Zhou et al. | |
| 2012/0124122 A1* | 5/2012 | el Kaliouby | A61B 5/165 709/202 |
| 2012/0179751 A1 | 7/2012 | Ahn et al. | |
| 2013/0176895 A1* | 7/2013 | McEachern | H04L 12/56 370/254 |
| 2015/0222617 A1* | 8/2015 | Ebersman | H04L 51/12 726/4 |

OTHER PUBLICATIONS

Bishop, Todd, "Microsoft idea: Analyze Facebook posts to deduce mood, interests, education", Geekwire, Apr. 20, 2012, <http://www.geekwire.com/2012/microsoft-idea-deduce-users-mood-smarts-facebook-posts-adjust-search-results/>.
"LobbyFriend—the Hotel Social Network", Copyright 2013 LobbyFriend Inc., <http://www.lobbyfriend.com/ >.

* cited by examiner

*Primary Examiner* — Alan S Chou
(74) *Attorney, Agent, or Firm* — Maeve M. Carpenter (57) ABSTRACT

In an approach to form groups based on an emotional state of a user, a computer determines an emotional state of a first user. The computer determines an emotional state of a plurality of users and determines the emotional state of at least one user of the plurality of users corresponding to the emotional state of the first user. The computer provides a recommendation for forming a group, based, at least in part, on the corresponding emotional states of the first user and the at least one user. The computer then determines, based on at least one criteria on the group, a duration for the group.

17 Claims, 4 Drawing Sheets

FORMING SOCIAL MEDIA GROUPS BASED ON EMOTIONAL STATES

TECHNICAL FIELD

The present invention relates generally to the field of messaging and communication in a data processing environment, and more particularly to managing contacts and forming social media groups of users for social interaction based on an emotional state of each user.

BACKGROUND

Instant messaging, email, and social network communication provide a convenient tool for collaboration among individuals. Over time, users accumulate a list of contacts of other users with whom they have communicated in the past via instant messaging, email, chat rooms, and social network communications. The contact list may include friends, family members, co-workers, and acquaintances, and the contacts may be organized into groups such as "friends", "family", "work", etc. However, users may desire to communicate with contacts in other than organized groups.

SUMMARY

An embodiment of the present invention discloses a method for forming groups based on an emotional state of a user. The embodiment includes a computer determining an emotional state of a first user and the computer determining an emotional state of a plurality of users. The computer determines the emotional state of at least one user of the plurality of users corresponding to the emotional state of the first user and provides a recommendation for forming a group, based, at least in part, on the determined corresponding emotional state of the first user and the at least one user, where the group includes the at least one user of the plurality of users and the first user. The computer then determines, based on at least one criteria on the group, a duration for the group including the first user.

A further embodiment of the present invention discloses a computer program product for forming groups based on an emotional state of a user. The embodiment includes one or more computer readable storage devices and program instructions stored on the one or more computer readable storage devices, including program instructions to determine an emotional state of a first user and an emotional state of a plurality of users. The program instructions determine the emotional state of at least one user of the plurality of users corresponding to the emotional state of the first user. The program instructions provide a recommendation for forming a group, based, at least in part, on the corresponding emotional state of the first user and the at least one user, the group including the at least one user of the plurality of users and the first user. The program instructions then determine, based on at least one criteria on the group, a duration for the group.

A further embodiment of the present invention discloses a computer system for forming groups based on an emotional state of a user. The embodiment includes one or more computer processors, one or more computer readable memories, one or more computer readable storage devices, and program instructions stored on the one or more computer readable storage devices for execution by the one or more computer processors via the one or more computer readable memories. The program instructions determine an emotional state of a first user and an emotional state of a plurality of users. The program instructions determine the emotional state of at least one user of the plurality of users corresponding to the emotional state of the first user. The program instructions provide a recommendation for forming a group, based, at least in part, on the corresponding emotional state of the first user and the at least one user, the group including the at least one user of the plurality of users and the first user. The program instructions then determine, based on at least one criteria on the group, a duration for the group.

In an embodiment, the present invention provides a method for deploying a system for forming groups based on an emotional state of a user, comprising: providing a computer infrastructure being operable to: determine an emotional state of a first user and determine an emotional state of a plurality of users; determine the emotional state of at least one user of the plurality of users corresponding to the emotional state of the first user and provide a recommendation for forming a group, based, at least in part, on the determined corresponding emotional state of the first user and the at least one user, where the group includes the at least one user of the plurality of users and the first user; and determine, based on at least one criteria on the group, a duration for the group including the first user.

DETAILED DESCRIPTION

Figure 1:
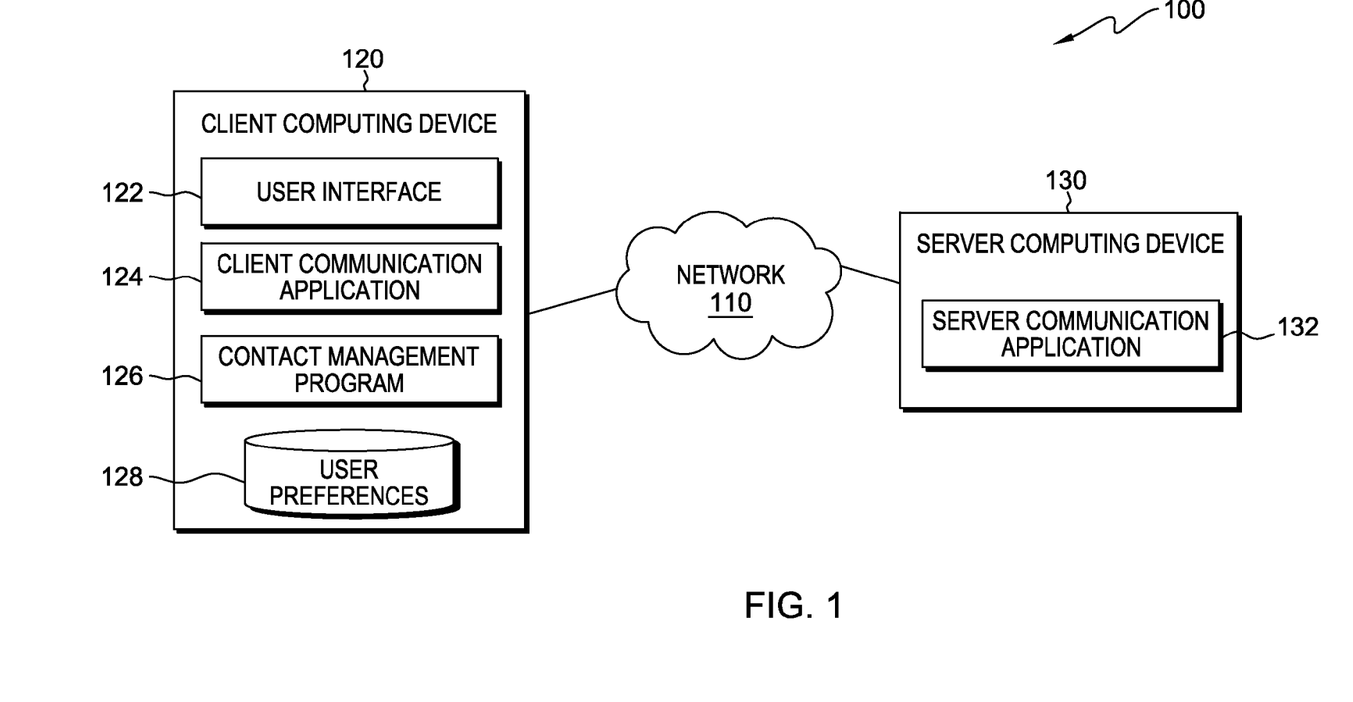
FIG. 1 is a functional block diagram illustrating a distributed data processing system, in accordance with an embodiment of the present invention.

The present invention will now be described in detail with reference to the Figures. FIG. 1 is a functional block diagram illustrating a distributed data processing system, generally designated 100, in accordance with one embodiment of the present invention. FIG. 1 provides only an illustration of one implementation and does not imply any limitations with regard to the systems and environments in which different embodiments may be implemented. Many modifications to the depicted environment may be made by those skilled in the art without departing from the scope of the invention as recited by the claims.

Distributed data processing system 100 includes client computing device 120 and server computing device 130, interconnected via network 110. Network 110 can be, for example, a local area network (LAN), a telecommunications network, a wide area network (WAN), such as the Internet, or any combination of the three, and can include wired, wireless, or fiber optic connections. In general, network 110 can be any combination of connections and protocols that will support communications between client computing device 120 and server computing device 130, in accordance with embodiments of the present invention.

In various embodiments of the present invention, client computing device 120 may be a desktop computer, a workstation, a laptop computer, a tablet computer, a personal computer (PC), a personal digital assistant (PDA), a smart phone, or any programmable electronic device or combination of electronic devices capable of executing machine readable program instructions and capable of communicating with server computing device 130 via network 110 and with various components and devices within distributed data processing system 100. Client computing device 120 includes user interface (UI) 122, client communication application 124, contact management program 126, and user preferences database 128. Client computing device 120 may include internal and external hardware components, as depicted and described with reference to FIG. 4.

UI 122 may be, for example, a graphical user interface (GUI) or a web user interface (WUI) and can display text, documents, web browser windows, instant message applications, user options, instructions for operation, and other application interfaces. A user interface, such as UI 122, refers to the information (such as graphic, text, and sound) an application presents to a user and the control sequences the user employs to control the program. There are many types of user interfaces that allow users to interact with electronic devices, such as a computer keyboard and mouse, through graphical icons and visual indicators, such as secondary notation, as opposed to text-based interfaces, typed command labels, or text navigation.

Client communication application 124 is software capable of retrieving and presenting information obtained from the World Wide Web. In an embodiment of the present invention, a user operating client computing device 120 can view and interact with a webpage or other such information stored on a computer system, such as server computing device 130, and retrieved by client communication application 124. The user may view and interact with the retrieved information, including, for example, an email application, an instant messaging application, or a social network application, on UI 122.

In embodiments of the present invention, contact management program 126 determines when a user is experiencing a particular mood or emotion, or the user's actions indicate a particular sentiment, such that the user may want to communicate with contacts or other users feeling the same way, and not necessarily contacts in one of the user's organized groups on a contact list. Contact management program 126 determines a user's emotional state while the user is operating within a communication application, such as client communication application 124. A user's emotional state may be input from the user, e.g., a status update stating the user is happy, or contact management program 126 may determine the user's emotional state using textual analysis methods or sentiment analysis methods, e.g., the user posts sad song lyrics the day after a relationship status change. Contact management program 126 retrieves emotional states of other users of the communication application within a data processing environment, including contacts of the user, such as distributed data processing system 100, and provides a recommendation to the user for forming a group of contacts for social interaction, with each contact in the group having a similar emotional state to that of the user. Upon formation of the recommended group, contact management program 126 monitors the emotional state of each contact and the user for changes, and if a change is detected, the contact or the user may be removed from the group or added to a different group. For example, if a user's sentiment changes from "happy" to "sad", contact management program 126 can recommend a different group including other users with a "sad" emotional state, indicated by a user status or by user actions. Contact management program 126 also monitors the group to determine whether a pre-defined duration for the group is met, for example, a user may set at least one criteria for a duration for a social media group to correspond to an online activity, such as discussion or online presence in a chat room, discussion forum, or other website where a user's identity is known.

User preferences database 128 stores preferences for operation of contact management program 126, as set by a user. For example, preferences may include criteria for duration of a group, such as a time duration or a number of users that should be in the group, a time interval in which to retrieve the emotional state of other users and contacts, or characteristics for group recommendations, such as matching only exact context and emotional state, or including varying degrees of similarity of emotional state. While user preferences database 128 is depicted in FIG. 1 within client computing device 120, user preferences database 128 may be located anywhere within distributed data processing system 100 provided user preferences database is accessible to contact management program 126 via network 110.

Server computing device 130 may be a management server, a web server, or any other electronic device or computing system capable of receiving and sending data. In other embodiments, server computing device 130 may represent a server computing system utilizing multiple computers as a server system, such as in a cloud computing environment. In another embodiment, server computing device 130 may be a laptop computer, a tablet computer, a netbook computer, a PC, a desktop computer, a PDA, a smart phone, or any programmable electronic device capable of communicating with client computing device 120 via network 110. In another embodiment, server computing device 130 represents a computing system utilizing clustered computers and components (e.g., database server computer, application server computers, etc.) that act as a single pool of seamless resources when accessed within distributed data processing system 100.

Server computing device 130 includes server communication application 132. Server communication application 132 is an application that can provide information accessed by client communication application 124, for example, information stored on server computing device 130, or information accessible via network 110 within distributed data processing system 100. In an embodiment of the present invention, contact management program 126 retrieves the emotional state of contacts of the user and other users operating client communication application 124 via server communication application 132.

Figure 2:
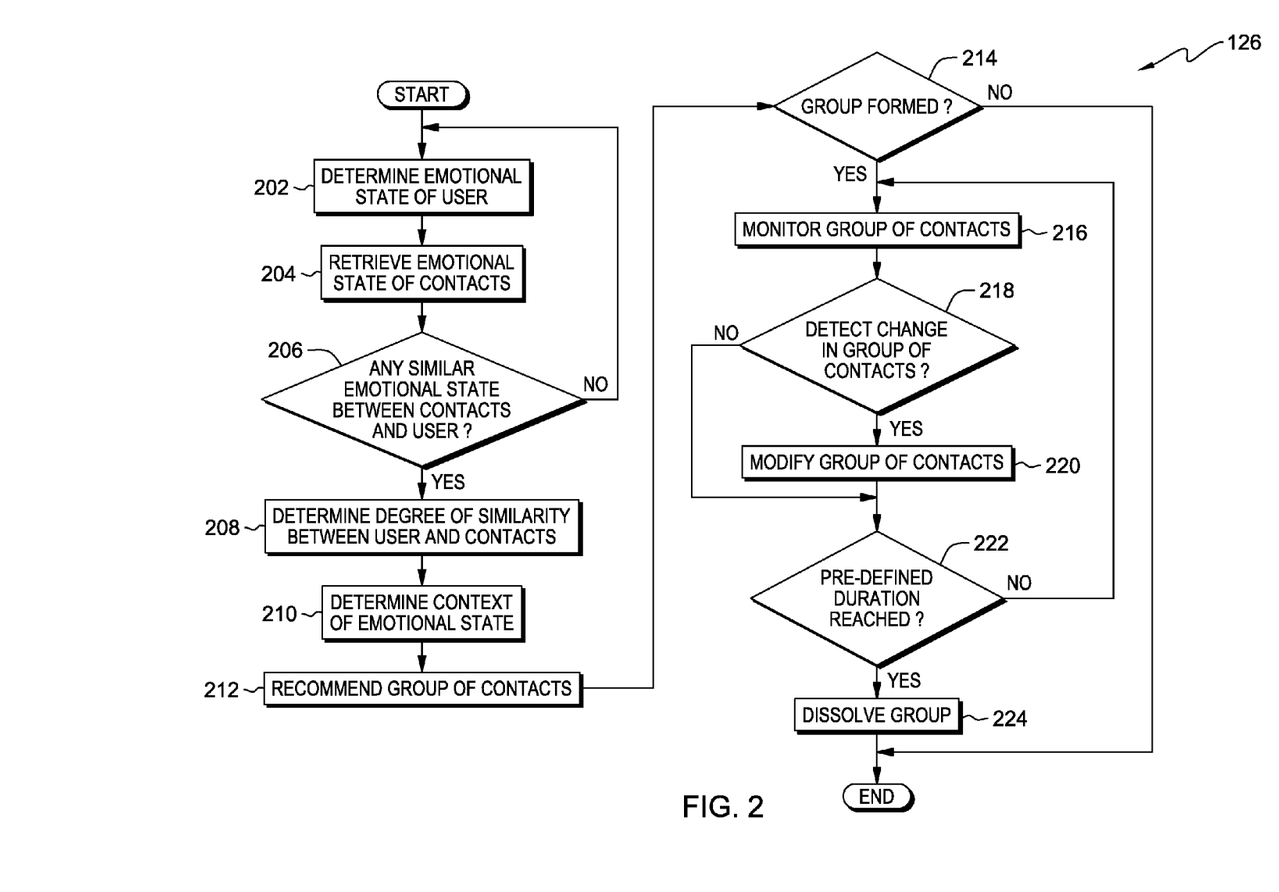
FIG. 2 is a flowchart depicting operational steps of a contact management program, in accordance with an embodiment of the present invention.

FIG. 2 is a flowchart depicting operational steps of contact management program 126, in accordance with an embodiment of the present invention.

Contact management program 126 determines an emotional state of a user (step 202). In embodiments of the present invention, contact management program 126 determines the emotional state of the user by analyzing the user's online activity, for example, search engine terms used, articles read, or online shopping sites, identifying a user's provided status, such as "I am mad", or identifying emoticons used, such as a smile or a sad face.

Contact management program 126 retrieves an emotional state for each contact of the user (step 204). In an embodiment, contact management program 126 examines a user's contact list, which can be created by the user, automatically created by client communication application 124, based on relationships the user has identified, or created by client communication application 124, based on contacts the user has communicated with in the past, and determines the emotional state of each contact. In other embodiments, contact management program 126 can retrieve an emotional state associated with additional contacts and users for the user to communicate with utilizing information on users connected to and using server communication application 132, which includes a social network application or an instant messaging application. Contact management program 126 can also identify users associated with support groups or organizations the user may be interested in communicating with based on the determined emotional state of the user. In another embodiment, contact management program 126 determines contacts based on a further degree of relationship, such as a relationship between the user and a contact connected to a contact on the user's contact list, for example, a friend of a friend.

Contact management program 126 determines whether a similar emotional state exists between the user and any of the user's contacts (decision block 206). Contact management program 126 determines whether an emotional state of the user corresponds to an emotional state of another user, or of a contact of the user. Contact management program 126 can determine corresponding similarities between emotional states at pre-defined intervals, for example, every fifteen minutes, every hour, or every day. In an embodiment, a user can set how often contact management program 126 determines corresponding similarities, and store such information in user preferences database 128. If there are no similar emotional states between the user and the user's contacts (decision block 206, "no" branch), contact management program 126 returns to determine the emotional state of the user (step 202).

If there are any similar emotional states among the user's contacts (decision block 206, "yes" branch), contact management program 126 determines a degree of similarity between the emotional state of the user and the user's contacts (step 208). In an embodiment, contact management program 126 determines emotional states of other users and the corresponding degree of similarity between the emotional state of the user and of any other users, for example, an exact match of an emotional state, or a lesser degree of a match, such as matching "sad" with "upset".

Contact management program 126 determines a context of the emotional states of the user and the user's contacts (step 210). A context of the emotional state is a reason for the emotional state, and can be based on a topic or area of interest, for example, user is happy because she is getting married. In embodiments, the context may be a sentiment and a status update by the user, or the context may be a post by the user about an engagement ring or a wedding date. In an embodiment of the present invention, contact management program 126 determines corresponding similarity between the user and any other users based on a match between contexts, or a degree of a match between contexts. For example, a user's emotional state context of "Olympics" may correspond with another user's emotional state context of "figure skating."

Contact management program 126 provides a recommendation for a group made up of contacts with similar emotional states as the user (step 212). A group recommendation may be based solely on a high degree of similarity, varying degrees of similarity between emotional states, or similar context matches. The user can pre-define characteristics for group recommendations, which can be stored in user preferences database 128 in distributed data processing system 100. In an embodiment, contact management program 126 recommends a group of contacts and other users for social interaction based on an emotional state of the user corresponding to the emotional state of one of the user's contacts. In another embodiment, contact management program 126 recommends a group of users based on the context of an emotional state of the user corresponding to the context of an emotional state of another user. In various embodiments, the recommendation provided to the user may be a list of contacts, a pop up dialog box, or any other notification including contacts with similar emotional states as the user.

Contact management program 126 determines whether the recommended group was formed (decision block 214). In an embodiment, contact management program 126 determines the recommended group is formed by receiving an indication of the group, for example, an indication from the user or an indication of a change in the organization of the contact list of the user. In various embodiments, the recommended group may be formed by the user, or the user may select only certain contacts or users in the recommended group for inclusion in a group. In embodiments of the present invention, contact management program 126 can provide an option to the user including a choice to hide the group from certain other contacts or all users of a communication application, or to share the group with the other contacts. Contact management program 126 may provide an option or recommendation to hide the group from the user, so the user is not able to view contacts with the same emotional state, for example, if the user is feeling sad, the user will not see other contacts that are sad. In other embodiments, contact management program 126 can perform each of the previous recommendations automatically and without notice to the user, based on the user's preferences stored in user preferences database 128. If the recommended group was not formed (decision block 214, "no" branch), contact management program 126 ends and there is no further processing. If the recommended group was formed (decision block 214, "yes" branch), contact management program 126 monitors the group of contacts (step 216). Contact management program 126 monitors the group of contacts for changes in emotional state, in context, or in severity of emotional state.

Contact management program 126 detects whether a change occurs in the group of contacts, either with one contact or with the group as a whole (decision block 218). If a change occurs with the emotional state or context of the user or a contact in the group (decision block 218, "yes" branch), contact management program 126 modifies the group of contacts (step 220). A change may be a changed emotional state of a contact, for example, from happy to sad, a change in context or reason for the emotional state, with the emotional state remaining the same, or a change in severity of an emotional state, for example, a crying emoticon changes to a frowning emoticon. If contact management program 126 detects a change in context with one or more of the contacts and the user, such as "upset about Olympics" to "upset about USA Hockey," the program can modify the group by splitting the "upset about Olympics" group into smaller groups for each context. Contact management program 126 can also modify the group by merging two or more groups based on a detected change in the emotional state of the user or one of the other users or contacts. If there is a change in the emotional state of one or more contacts or users in the group, contact management program 126 can remove the contact or move the contact to another group.

If there is no change detected in the group of contacts (decision block 218, "no" branch), contact management program 126 determines whether a pre-defined duration is reached (decision block 222). The user can store criteria for a duration preference for groups in user preferences database 128, for example, a default time period, a number of users that should be in the group, a percentage, based on the number of users in the formed group, of users remaining in the group, a persistence of the emotional state or sentiment of the user, a persistence of the emotional state or sentiment of another user or of the group, a minimum number of contacts in the group, presence of an ongoing online activity, such as a discussion or a chat on a website, or the user indicates the group should dissolve. If the pre-defined duration is not reached (decision block 222, "no" branch), contact management program 126 returns to monitoring the group of contacts (step 216). If the pre-defined duration is reached (decision block 222, "yes" branch), contact management program 126 dissolves the group and the group is removed (step 224). In an embodiment, a criteria on a duration of a group can be a continuing emotional status of the group, for example, if a group was formed based on a "sad" emotional state of the user and other users, if a user no longer meets the criteria, meaning the user is no longer "sad", the user leaves the group or the group is dissolved. In an embodiment, the group is archived within client communication application 124 and can be recalled when the user returns to the emotional state associated with the group. In another embodiment, contact management program 126 notifies the user the group is to dissolve, and the user may decide whether to keep the group or dissolve the group.

Figure 3:
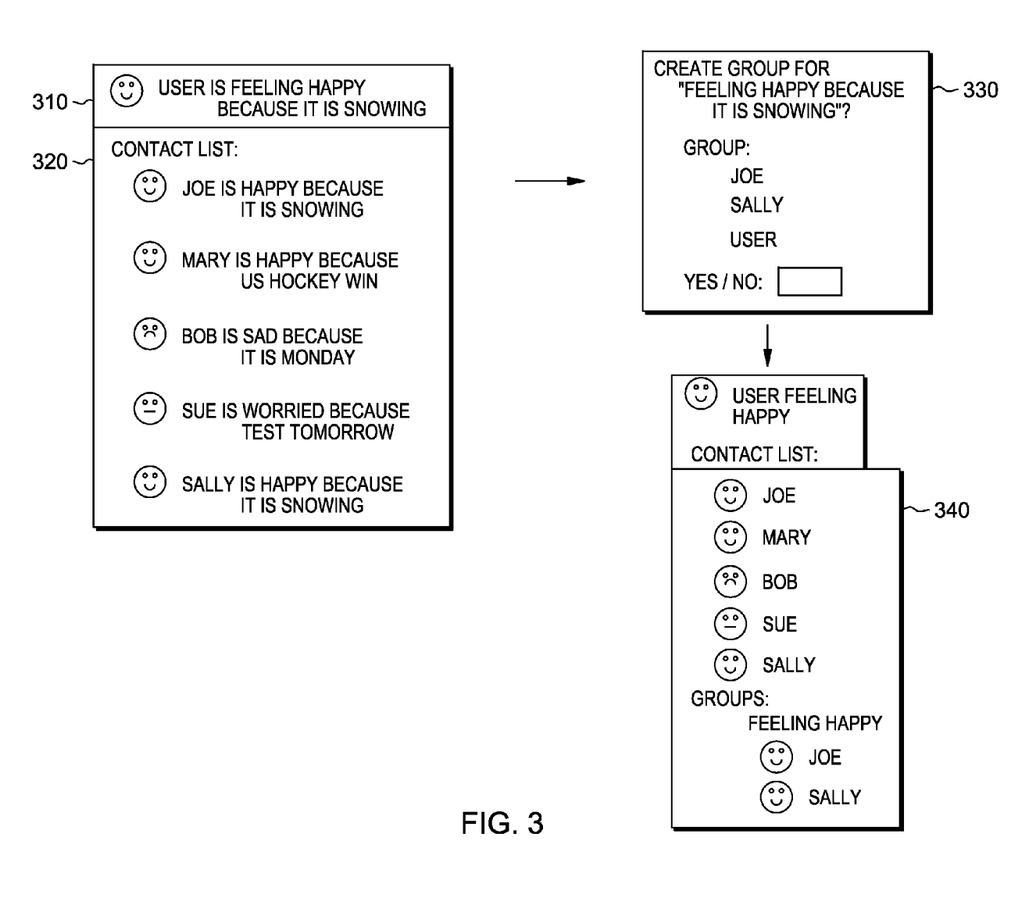
FIG. 3 illustrates an operation of the contact management program of FIG. 2, in accordance with an embodiment of the present invention.

FIG. 3 illustrates an operation of contact management program 126, in accordance with an embodiment of the present invention.

User status 310 depicts that a user is "feeling happy because it is snowing." The user contact list 320 includes several contacts, including "Joe" and "Sally" who are feeling happy for the same reason as the user, and "Mary" who is feeling happy for a different reason. In the illustrated embodiment, contact management program 126 determines contacts with a corresponding emotional state as the user and a corresponding context for the emotional state, e.g., "Joe" and "Sally", and recommends to the user, in dialog box 330, forming a group of social media contacts with contacts sharing the corresponding similar emotional state and context. If the user decides to form the group, a social media group is created that includes the contacts with the corresponding similar emotional state and context, as shown in contact list 340. In another embodiment, contact management program 126 determines contacts with a corresponding similar emotional state, and does not include the context for the emotional state, for example, including "Mary" in the group recommendation because she is "feeling happy" and not taking into account that Mary is "happy because USA Hockey win."

Figure 4:
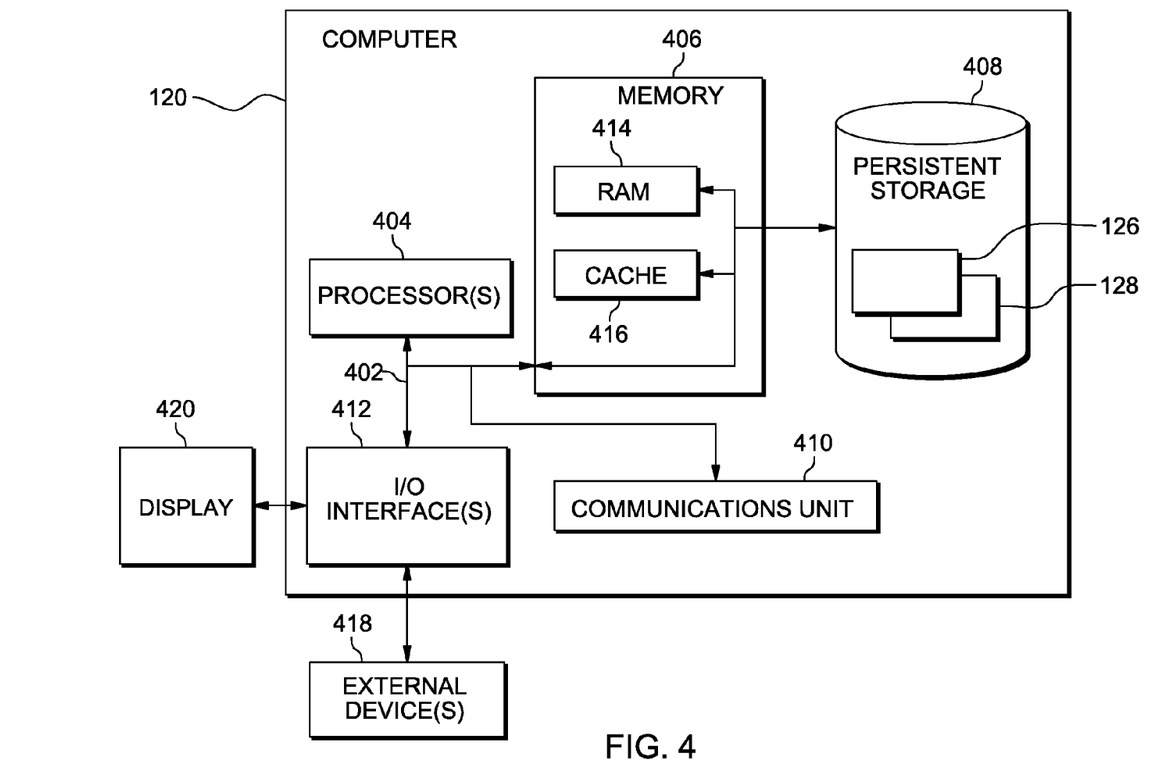
FIG. 4 depicts a block diagram of components of a data processing system, such as the client computing device of FIG. 1, in accordance with an embodiment of the present invention.

FIG. 4 depicts a block diagram of components of client computing device 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computing device 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Contact management program 126 and user preferences database 128 can be stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computing device 130. In these examples, communications unit 410 includes one or more network interface cards. Communications unit 410 may provide communications through the use of either or both physical and wireless communications links. Contact management program 126 and user preferences database 128 may be downloaded to persistent storage 408 through communications unit 410.

I/O interface(s) 412 allows for input and output of data with other devices that may be connected to client computing device 120. For example, I/O interface(s) 412 may provide a connection to external device(s) 418 such as a keyboard, a keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., contact management program 126 and user preferences data 128, can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor or an incorporated display screen, as used in tablet computers and smart phones.

In another embodiment, the invention provides a method that performs the process of the invention on a subscription, advertising, and/or fee basis. That is, a service provider, such as a Solution Integrator, could offer to provide forming groups based on emotional states functionality. In this case, the service provider can create, maintain, support, etc., a computer infrastructure, such as client computing device 120 (FIG. 4) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for group formation based on emotional states. In this case, a computer infrastructure, such as client computing device 120 (FIG. 4), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as client computing device 120 (FIG. 4), from a computer-readable medium; (2) adding one or more computing devices to the computer infrastructure; and (3) incorporating and/or modifying one or more existing systems of the computer infrastructure to enable the computer infrastructure to perform the processes of the invention.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for forming groups based on an emotional state of a user, the method comprising:
   a computer determining an emotional state of a first user and an emotional state of a plurality of users, wherein the emotional state is determined by performing at least textual analysis on online activity of the first user and each of the plurality of users;
   the computer determining the emotional state of at least one user of the plurality of users corresponding to the emotional state of the first user;
   the computer providing a recommendation for forming a group, based, at least in part, on the corresponding emotional state of the first user and the at least one user, the group including the at least one user of the plurality of users and the first user;
   the computer determining, based on at least one criteria on the group, a duration for the group;
   the computer receiving an indication the group is formed, the group including the first user and the at least one user of the plurality of users;
   the computer monitoring the emotional state of the first user, the emotional state of the at least one user of the plurality of users, and the emotional state of each of the plurality of users;
   the computer detecting a change in the emotional state of one or more users of the plurality of users; and
   responsive to detecting a change in the emotional state of one or more users of the plurality of users, the computer modifying, based, at least in part on the change, the group.

2. The method of claim 1, further comprising:
   the computer determining a context associated with the emotional state of the first user;
   the computer determining, for each of the plurality of users, a context associated with the emotional state;
   the computer determining, at least one user of the plurality of users with a context corresponding to the context associated with the emotional state of the first user; and
   the computer providing a recommendation for forming a group, based, at least in part, on the corresponding emotional state and the corresponding context of the emotional state of the first user and the at least one user, the group including the at least one user and the first user.

3. The method of claim 1, further comprising:
   the computer receiving an indication the group is formed;
   the computer determining the duration for the group is reached; and
   responsive to determining the duration for the group is reached, the computer dissolving the group.

4. The method of claim 1, wherein the computer determining, based on at least one criteria on the group, a duration for the group further comprises:
   the computer determining at least one criteria of the first user and at least one other user in the group, wherein criteria includes one or more of: a time period, a continuing emotional status of the group, a number of users in the group, a percentage of users remaining in the group, a persistence of a sentiment of the first user, and a persistence of the sentiment of at least one other user.

5. The method of claim 1, wherein the computer determining an emotional state of the first user includes at least one of: the computer detecting an emoticon used by the first user, and the computer receiving an emotional state from the first user.

6. The method of claim 1, wherein the computer determining the emotional state of at least one user of the plurality of users corresponding to the emotional state of the first user further comprises the computer determining one or more of: an exact match between the emotional state of the first user and the at least one user, a degree of a match between the emotional state of the first user and the at least one user, and a context match between the emotional state of the first user and the at least one user.

7. The method of claim 1, further comprising:
   the computer detecting a change in the emotional state of the first user; and
   responsive to detecting a change in the emotional state of the first user, the computer modifying, based, at least in part on the change, the group.

8. The method of claim 1, wherein the computer modifying, based, at least in part on the change, the group, includes one or more of: the computer splitting the group into more than one group, the computer merging the group with another group, the computer removing a user from the group, the computer removing the first user from the group, and the computer adding a user to the group.

9. The method of claim 1, further comprising:
   the computer determining an emotional state of each of a plurality of contacts of the first user;
   the computer determining the emotional state of at least one contact of the plurality of contacts corresponding to the emotional state of the first user; and
   the computer providing a recommendation for forming a group, based, at least in part, on the corresponding emotional state of the first user and the at least one contact of the plurality of contacts, the group including the at least one contact of the plurality of contacts and the first user.

10. The method of claim 9, further comprising providing a recommendation for forming a group, based, at least in part, on the corresponding emotional state of the first user, the at least one user of the plurality of users, and the at least one contact of the plurality of contacts, the group including the first user, the at least one user of the plurality of users, and the at least one contact of the plurality of contacts.

11. The method of claim 10, further comprising:
    the computer receiving an indication the group is formed, the group including the first user, the at least one user of the plurality of users, and the at least one contact of the plurality of contacts;

the computer monitoring the emotional state of the first user, the emotional state of the at least one user of the plurality of users, and the emotional state of the at least one contact of the plurality of contacts, the emotional state of each of the plurality of contacts, and the emotional state of each of the plurality of users;

the computer detecting a change in one of: the emotional state of the first user, the emotional state of the at least one user of the plurality of users, the emotional state of the at least one contact of the plurality of contacts, the emotional state of one or more of the plurality of contacts, and the emotional state of one or more of the plurality of users; and responsive to detecting a change, the computer modifying, based, at least in part on the change, the group.

12. A computer program product for forming groups based on an emotional state of a user, the computer program product comprising:

one or more computer readable storage devices and program instructions stored on the one or more computer readable storage devices, the program instructions comprising:

program instructions to determine an emotional state of a first user and an emotional state of a plurality of users, wherein the emotional state is determined by performing at least textual analysis on online activity of the first user and each of the plurality of users;

program instructions to determine the emotional state of at least one user of the plurality of users corresponding to the emotional state of the first user;

program instructions to provide a recommendation for forming a group, based, at least in part, on the corresponding emotional state of the first user and the at least one user, the group including the at least one user of the plurality of users and the first user;

program instructions to determine, based on at least one criteria on the group, a duration for the group;

program instructions to receive an indication the group is formed, the group including the first user and the at least one user of the plurality of users;

program instructions to monitor the emotional state of the first user, the emotional state of the at least one user of the plurality of users, and the emotional state of each of the plurality of users;

program instructions to detect a change in the emotional state of one or more users of the plurality of users; and responsive to detecting a change in the emotional state of one or more users of the plurality of users, program instructions to modify, based, at least in part on the change, the group.

13. The computer program product of claim 12, further comprising:

program instructions to determine a context associated with the emotional state of the first user;

program instructions to determine, for each of the plurality of users, a context associated with the emotional state;

program instructions to determine, at least one user of the plurality of contacts with a context corresponding to the context associated with the emotional state of the first user; and program instructions to provide a recommendation for forming a group, based, at least in part, on the corresponding emotional state and the corresponding context of the emotional state of the first user and the at least one user, the group including the at least one user and the first user.

14. The computer program product of claim 12, further comprising:

program instructions to receive an indication the group is formed;

program instructions to determine the duration for the group is reached; and responsive to determining the duration for the group is reached, program instructions to dissolve the group.

15. A computer system for forming groups based on an emotional state of a user, the computer system comprising:

one or more computer processors, one or more computer readable memories, one or more computer readable storage devices, and program instructions stored on the one or more computer readable storage devices for execution by the one or more computer processors via the one or more computer readable memories, the program instructions comprising:

program instructions to determine an emotional state of a first user and an emotional state of a plurality of users, wherein the emotional state is determined by performing at least textual analysis on online activity of the first user and each of the plurality of users;

program instructions to determine the emotional state of at least one user of the plurality of users corresponding to the emotional state of the first user;

program instructions to provide a recommendation for forming a group, based, at least in part, on the corresponding emotional state of the first user and the at least one user, the group including the at least one user of the plurality of users and the first user;

program instructions to determine, based on at least one criteria on the group, a duration for the group;

program instructions to receive an indication the group is formed, the group including the first user and the at least one user of the plurality of users;

program instructions to monitor the emotional state of the first user, the emotional state of the at least one user of the plurality of users, and the emotional state of each of the plurality of users;

program instructions to detect a change in the emotional state of one or more users of the plurality of users; and responsive to detecting the change in the emotional state of one or more users of the plurality of users, program instructions to modify, based, at least in part on the change, the group.

16. The computer system of claim 15, further comprising:

program instructions to determine a context associated with the emotional state of the first user;

program instructions to determine, for each of the plurality of users, a context associated with the emotional state;

program instructions to determine, at least one user of the plurality of contacts with a context corresponding to the context associated with the emotional state of the first user; and program instructions to provide a recommendation for forming a group, based, at least in part, on the corresponding emotional state and the corresponding context of the emotional state of the first user and the at least one user, the group including the at least one user and the first user.

17. The computer system of claim 15, further comprising:

program instructions to receive an indication the group is formed;

program instructions to determine the duration for the group is reached; and responsive to determining the duration for the group is reached, program instructions to dissolve the group.

* * * * *